United States Patent [19]

Ott et al.

[11] 4,100,636
[45] Jul. 18, 1978

[54] CUTTER

[75] Inventors: Theodor Ott, Mönthal; Max Gaisser, Zollikerberg, both of Switzerland

[73] Assignee: Theodor Ott, Mönthal, Switzerland

[21] Appl. No.: 614,781

[22] Filed: Sep. 19, 1975

[30] Foreign Application Priority Data

Jul. 18, 1975 [CH] Switzerland ............... 9425/75

[51] Int. Cl.² .................. B25F 1/00; B26B 29/00
[52] U.S. Cl. ........................... 7/158; 30/286; 30/333; 7/114
[58] Field of Search ............ 30/318, 299 A, 339, 30/335, 286, 287, 333; 7/14.1 R

[56] References Cited

U.S. PATENT DOCUMENTS

| 919,307 | 4/1909 | Becken | 30/339 X |
|---|---|---|---|
| 933,626 | 9/1909 | Coomber | 30/286 |
| 1,192,748 | 7/1916 | Bundy | 30/286 |
| 1,239,626 | 9/1917 | Seebring | 30/286 |
| 1,372,609 | 3/1921 | Echevarria | 7/14.1 R X |
| 1,759,607 | 5/1930 | Dunn | 30/286 |
| 1,814,596 | 7/1931 | Hamel | 30/286 |
| 2,182,354 | 12/1939 | Richstone | 30/333 |
| 2,828,543 | 4/1958 | Valentine | 30/333 X |

FOREIGN PATENT DOCUMENTS

| 83,547 | 3/1919 | Switzerland | 30/339 |
| 9,311 of | 1911 | United Kingdom | 30/339 |

*Primary Examiner*—James L. Jones, Jr.
*Assistant Examiner*—Roscoe V. Parker
*Attorney, Agent, or Firm*—Michael J. Striker

[57] ABSTRACT

A grass edge trimmer includes a blade having at least one longitudinal cutting edge mounted on a handle by means of a pair of clamping portions. The clamping portions are located on opposite sides of the blade and engage the same along but spaced from said cutting edge so as to stiffen the blade. One of the clamping portions is removable from the handle and permits a worn cutting edge of the blade to be interchanged for a fresh cutting edge.

12 Claims, 7 Drawing Figures

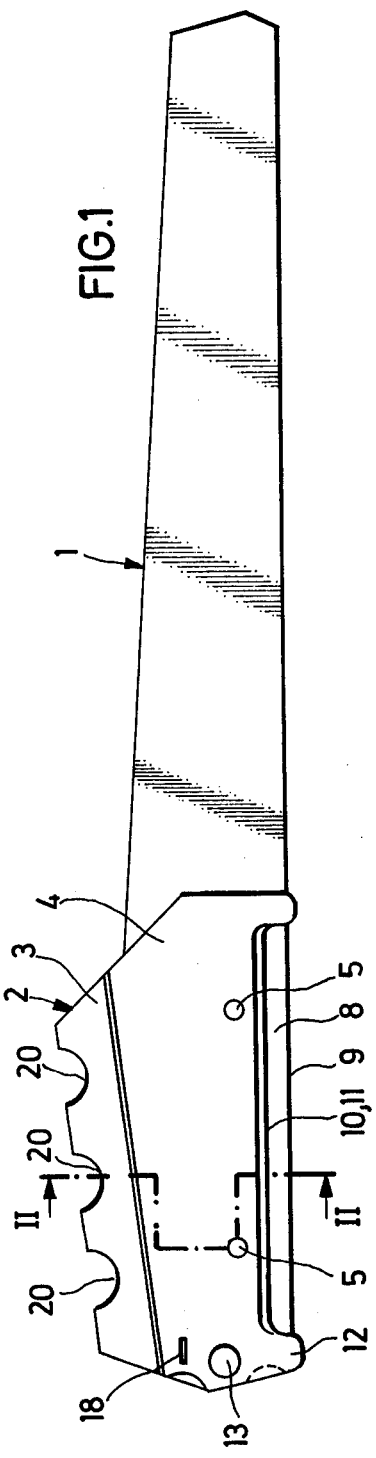

CUTTER

BACKGROUND OF THE INVENTION

The present invention relates to a cutter, and more particularly to a grass edge cutter or trimmer. In the prior art, it is known to utilize manually- or motor-operated shears to cut or trim the edges of a grass lawn. However, the manually-operated shears take a considerable amount of time for one to trim the grass lawn. The motor-operated shears are not only expensive to manufacture, but are also expensive to operate. In either case, the scissor-like action of the shears is frequently clogged with grass cuttings so that additional time and labor must be spent in order to remove the grass cuttings.

Another prior art approach known in the art of cutting grass uses a cord or filament piece having one end attached to a rotor driven about a vertical axis. In operation, the cord projects radially outwardly of the shaft axis by centrifugal action and is generally very effective in cutting the grass as the cord rotates. However, this construction has the disadvantage that it is extremely noisy to operate, as well as being expensive to manufacture.

SUMMARY OF THE INVENTION

Accordingly, it is the general object of the present invention to overcome the disadvantages of the prior art.

More particularly, it is an object of the present invention to provide a cutter which has a high cutting effectiveness.

Another object of the present invention is to improve the cutting effectiveness by supporting a blade of the cutter so that it will not flex when it encounters hard objects, such as stones.

A further object of the invention is to provide a cutter which is not subject to clogging by grass cuttings.

An additional object of this invention is to provide a cutter which requires minimal amounts of mechanical energy.

Still another object of the present invention is to quickly and easily interchange a blade having a worn cutting edge with a fresh one.

Still a further object of the present invention is to provide an economical cutting tool.

In keeping with these objects and others which will become apparent hereinafter, one feature of the invention is embodied in means for supporting a blade having at least one longitudinal cutting edge on a handle. The supporting means includes a pair of clamping portions on opposite sides of the blade, each of which engage the blade along but spaced from the cutting edge for stiffening the blade.

This feature achieves all of the aforementioned objectives and overcomes the cited disadvantages of the prior art in a simple but novel manner. By clamping the blade all along the relatively thin and flexible longitudinal cutting edge, the strength of the blade is substantially increased. Thus, when hard objects commonly found on grass lawns, such as rocks and pebbles, are encountered, the blade will not snap and be destroyed.

Moreover, by securing one of the clamping portions securely to the handle and by friction-tightly mounting the other of the clamping portions, on the fixed clamping portion, the other clamping portion is quickly and easily removable from the handle. This feature assures that a worn cutting edge can be easily interchanged with a fresh one.

Another feature of the present invention is to provide a rake or comb means on the handle at a location spaced away from the cutting edge. The rake means is operative for brushing away cuttings. This additional feature provides a user with the convenience of having a single tool to trim and rake the grass.

Still a further feature of the present invention utilizes protective means for covering and protecting a forward projecting portion of the clamping portions which engages a forward end of the cutting blade. In the case where the cutter is used to trim grass growing at the side of a wall the forward projecting portion engages and slides along the wall and is thereby subjected to wear due to friction. Hence, the protective means, which is generally a U-shaped cap of wear-resistant material, surrounds opposite sides of the projecting portion so as to cover it and protect it from abrasion.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a side view of an apparatus according to the present invention;

FIG. 2 is a sectional side view as seen along the broken line II—II according to FIG. 1;

FIG. 3 is a side view showing a detail of the apparatus according to the present invention;

FIG. 4 is a view of a detail of the apparatus according to the present invention;

FIG. 5 is a broken-away view showing the protecting means of the apparatus according to the present invention;

FIG. 6 is a side view showing the protective means; and

FIG. 7 is a view of the protective means of FIG. 6 in the direction of the arrow VII.

DESCRIPTION OF THE PREFERRED EMBODIMENTS

Referring to the exemplary cutter illustrated in the FIG. 1, it will be seen that reference numeral 1 identifies an elongated handle or hand grip. Reference numeral 8 identifies a blade having at least one longitudinal cutting edge 9. Reference numeral 2 identifies the cutting head or the means for supporting the blade 8 on the handle 1.

The cutting head 2 comprises a fixed or stationary clamping portion 3 (shown more clearly in FIG. 3) which is securely mounted to the handle 1 and the removable clamping portion 4 (as shown more clearly in FIG. 4). When the clamping portions 3, 4 are assembled, as will be described herein, they engage opposite sides of the blade 8 along but spaced from the cutting edge 9.

Fixed clamping portion 3 has at least one, and preferably a pair of pins 5 projecting normally outwardly of its generally flat planar exterior surface and spaced longitudinally along the cutting edge 9. The movable clamping portion 4 has at least one, and preferably a pair of cooperating openings 6 which are adapted to receive the pins 5. The coacting pins 5 and openings 6 can have any cross-sectional shape, preferably annular as illustrated, and are adapted to interfit with a friction-tight connection. Such an interference-type connection not only permits the clamping portions 3 and 4 to be securely joined together, by pushing the pins 5 into the openings 6, but also permits the clamping portions 3 and 4 to be easily separated, when necessary.

Intermediate the clamping portions 3 and 4, a hollow space 7 is formed in which the blade 8 is accommodated. The blade 8 has two bores which register with the coacting pins 5 and openings 6. As indicated by the dot-dashed lines of FIG. 3, the planar, rectangular blade 8 is seated within the space 7. The aforementioned longitudinal cutting edge 9 is located at one of the relatively longer edges of the blade 8, and an additional longitudinal cutting edge that is identical to the first-mentioned cutting edge, is located at the other of the relatively longer edges of the blade 8. The blade 8 is thereby clamped and affirmatively locked in position.

Each of the clamping portions 3 and 4 have a longitudinal stiffening edge 10 and 11, respectively. The stiffening edges 10 and 11 extend parallel to the cutting edge 9 and engage the opposite sides of the blade along but spaced from the cutting edge 9.

In addition, the C-shaped clamping portions 3 and 4 have projecting portions located at the relatively shorter edges of the blade 8. Projecting or nose portion 12 engages a forward or front end of the blade and projects transversely beyond the cutting edge 9. Thus, the blade 8 is held over its entire length and up to and-/or beyond the ends of the blade 8. By this three-sided supporting arrangement, the blade 8, which is relatively thin and flexible without such support, will be stiffened. In operation, if the blade 8 encounters hard objects, it will not bend, nor be destroyed.

At opposite sides of the cutter, projections 13 and 14 are respectively located on clamping portions 4 and 3. The projections or camming pins 13 and 14 project outwardly of the generally flat clamping portions 4 and 3 and have a half-spherical configuration. During the cutting operation, the projections 13 and 14 are able to serve as supports.

As more clearly shown in FIG. 5, protective means or a generally U-shaped cap 15 of wear-resistant material surrounds the projecting portion 12. The cap 15 may be constructed of any metallic material which is wear-resistant and not easily damaged by abrasion. For example, wear-resistant steel may be used.

The protective cap 15 has a pair of indentations 16 or dimples on either side of its shanks. The indentations 16 are cup-shaped and are adapted to respectively engage the projections 13 and 14 of the clamping portions 4 and 3. The material of the protective cap 15 is also slightly elastically resilient so that the indentations 16 can be snapped into position over the projections 13 and 14.

The ends 17 of the U-shaped protective cap 15 are bent inwardly towards each other and are adapted to fit into slits 18 and 19 respectively provided in the clamping portions 4 and 3. Thus, the protective cap 15 protects the projecting portion 12 as well as the projections 13 and 14 against abrasion.

In operation, the blade 8 and the protective cap 15 can each be simply interchanged, whenever necessary. After a long period of usage has worn down the cutting effectiveness of the edge 9, the removable portion 4 can be separated from the fixed clamping portion 3 and the blade 8 turned over so that the additional cutting edge, which has a fresh razor-sharp knife edge, will now be exposed. To trim grass, an operator holds the cutter by means of the handgrip 1 and moves the cutter with a to-and-fro movement in a direction along the grass edge.

In those cases where the edge of the grass is located along a wall or other structure, for example, a belt-guide, the projecting portion 12 is placed against the wall, and the cutting edge 9 is oriented at a sharp acute angle with respect to the wall. The operator then pulls the cutter along the wall so that the projecting portion 12 slides on the outer surface of the wall, while the cutting edge 9 is constantly being maintained at about the same sharp acute angle. Hence, by guiding the cutter along the wall in this manner, the grass growing thereat will initially be bent by the projecting portion 12 against the cutting edge 9, and thereupon the grass will be bent between the cutting edge 9, the projecting portion 12 and the wall. After that, the grass is pressed against the cutting edge 9, and finally the grass is cut through.

Returning to FIG. 1, it will be seen that the handle 1 is elongated in a direction essentially parallel to the cutting edge 9. The center of gravity of the illustrated cutter, therefore, lies substantially along the longitudinal axis of the handle. Thus, the cutter is capable of being conveniently manipulated by a user in spite of its light weight.

Alternatively, the handle 1 and the cutting head 2 can be offset from one another by a Z-shaped intermediate part, similar to those handles taught by the art of cake-server spoons. Such an offset arrangement is particularly desirable in order to protect the fingers of a user from being scratched.

The length of the handle 1 can vary substantially between 10 and 100 centimeters. With the longer handles, it is particularly advantageous if the cutting head 2 is provided on an inclined portion of the handle.

The blade 9 may be constituted of any material capable of being provided with a sharp cutting edge, e.g. metal or plastic material. Thicknesses on the order of 0.1 – 1.00 mm., and preferably 0.1 – 0.5 mm., may be chosen, of course, the thinner the thickness of the blade 8, the longer the blade will maintain its sharpness.

Grooves 20 are provided on the cutting head 2 on its side remote from the exposed cutting edge 9. The grooves 20 distributed along the elongation of the cutting edge are fashioned after a comb or rake and are operative for brushing away grass cuttings.

It will be understood that each of the elements described above, or two or more together, may also find a useful application in other types of constructions differing from the types described above.

While the invention has been illustrated and described as embodied in a cutter, it is not intended to be limited to the details shown, since various modifications and structural changes may be made without departing in any way from the spirit of the present invention.

Without further analysis, the foregoing will so fully reveal the gist of the present invention that others can by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A cutter, particularly a grass edge cutter, comprising a handle; a blade having two elongated cutting edges spaced from each other in a direction transverse to the direction of elongation of said cutting edges and each formed with opposite end regions spaced from each other in said direction of elongation; and means for supporting said blade on said handle, having a pair of clamping members operative for clamping said blade therebetween in an operative position, and for releasing said blade so as to detach the latter therefrom, said clamping members in said operative position protecting at least one of said end regions of one of said cutting edges from wear whereas the remainder of said one cutting edge is exposed, and said clamping members in said operative position simultaneously also completely protecting the other cutting edge, at least one of said clamping members having a first projecting portion located in the vicinity of said one end region of said one cutting edge and extending for a predetermined distance in a first direction transverse to said direction of elongation and beyond said one cutting edge so as to protect said one end region of said one cutting edge from wear, and a second projecting portion located in the vicinity of said other cutting edge and extending for a predetermined distance in a second transverse direction substantially opposite to said first transverse direction and beyond said other cutting edge so as to completely protect said other cutting edge.

2. A cutter as defined in claim 1, wherein one of said clamping members is securely mounted to said handle and has a pair of pins projecting outwardly thereof, and wherein the other of said clamping members is removable from said handle and has a pair of openings for friction-tightly receiving said pins.

3. A cutter as defined in claim 1, wherein said clamping members are generally planar and have a longitudinal stiffening edge engaging said blade along but spaced from said cutting edge, and a further projecting portion also located on at least one of said clamping members in the vicinity of the other one of said one end regions of said cutting edge and extending for a predetermined distance in said first transverse direction beyond said one cutting edge so as to protect said other end region from wear and cooperate with said first projecting portion and said stiffening edge for stiffening said blade.

4. A cutter as defined in claim 1, wherein said first and said further projecting portions are of wear-resistant material.

5. A cutter as defined in claim 3, wherein each of said clamping members have a projection extending outwardly thereof.

6. A cutter as defined in claim 5; and further comprising means for guarding said first projecting portion from wear, said guarding means being a generally U-shaped cap of wear-resistant material having opposite sides which surround said first projecting portion, said opposite sides of said cap having a pair of indentations which respectively engage said projections of said clamping members.

7. A cutter as defined in claim 6; and further comprising slits on said clamping members, and wherein said cap has inwardly-bent ends insertable into said slits.

8. A cutter as defined in claim 1, wherein said blade is planar and has a thickness substantially between 0.1 and 1.0 mm.

9. A cutter as defined in claim 1; and further comprising rake means on said handle spaced from said cutting edges, including a plurality of grooves for brushing away cuttings.

10. A cutter as defined in claim 9; wherein said grooves face in direction away from said one cutting edge.

11. A cutter as defined in claim 1, wherein said handle is elongated in a direction substantially parallel to said elongated cutting edge.

12. A cutter as defined in claim 11, wherein the center of gravity of the cutter lies along the elongation of said handle.

* * * * *